(12) United States Patent
Ly et al.

(10) Patent No.: US 9,489,341 B1
(45) Date of Patent: Nov. 8, 2016

(54) PREDICTION OF IMPENDING FAILURE OF A CLIMATE CONTROL SYSTEM

(71) Applicant: The Boeing Company, Chicago, IL (US)

(72) Inventors: Sidney Ly, Seattle, WA (US); Michael A. Bodach, Daniel Island, SC (US)

(73) Assignee: The Boeing Company, Chicago, IL (US)

( * ) Notice: Subject to any disclaimer, the term of this patent is extended or adjusted under 35 U.S.C. 154(b) by 678 days.

(21) Appl. No.: 13/865,201

(22) Filed: Apr. 18, 2013

(51) Int. Cl.
*G01L 11/02* (2006.01)
*G06F 17/00* (2006.01)

(52) U.S. Cl.
CPC ..................................... *G06F 17/00* (2013.01)

(58) Field of Classification Search
CPC ..................................................... G01J 5/0896

USPC ........................................ 702/41, 42; 356/43
See application file for complete search history.

(56) References Cited

U.S. PATENT DOCUMENTS

| 7,392,158 | B2 | 6/2008 | Hikawa et al. | |
|---|---|---|---|---|
| 2012/0123702 | A1* | 5/2012 | Chen | G01K 11/32 702/42 |
| 2012/0327394 | A1* | 12/2012 | Matsudo | G01J 5/0007 356/43 |

FOREIGN PATENT DOCUMENTS

| EP | 0490990 B1 | 12/1995 |
|---|---|---|
| EP | 1906290 B1 | 8/2011 |

* cited by examiner

*Primary Examiner* — Lam Nguyen
(74) *Attorney, Agent, or Firm* — Miller, Mathias & Hull LLP

(57) ABSTRACT

A prediction of an impending failure in a climate control system is based on degradation of a second harmonic in a temperature history of the system.

14 Claims, 4 Drawing Sheets

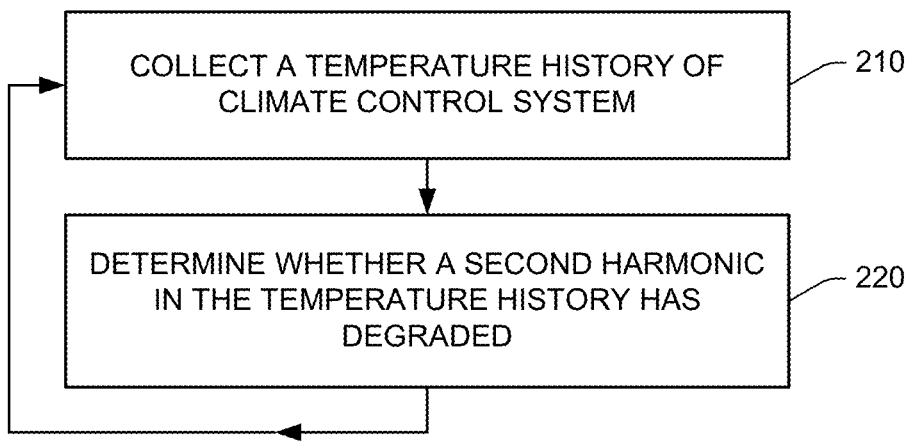
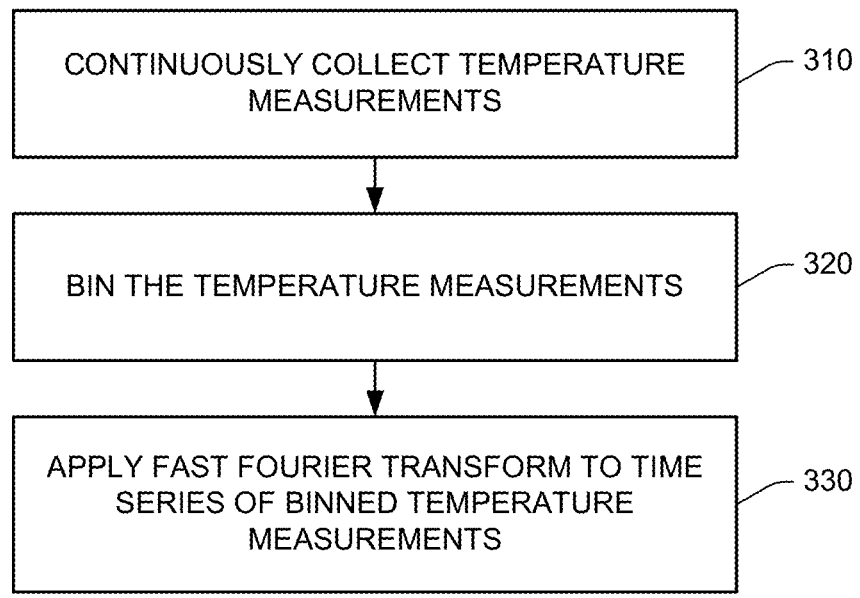

PREDICTION OF IMPENDING FAILURE OF A CLIMATE CONTROL SYSTEM

BACKGROUND

An industrial grade freezer may suddenly fail and become unable to maintain storage temperatures with a required range. If the freezer fails and there is insufficient time to diagnose and repair the failure or move the materials stored within to another freezer, the stored materials can become unusable.

Advance warning of impending failure would be highly desirable.

SUMMARY

According to an embodiment herein, a method comprises using a processor to predict an impending failure in a climate control system based on degradation of a second harmonic in a temperature history of the system.

According to another embodiment herein, a method of storing material comprises refrigerating the material, monitoring a second harmonic of temperatures at which the material is refrigerated, and taking a corrective action if the second harmonic has degraded.

According to another embodiment herein, a processor is programmed to predict an impending failure in a climate control system based on degradation of a second harmonic in a temperature history of the system.

According to another embodiment herein, an article comprises computer memory encoded with data for causing a processor to monitor a second harmonic in a temperature history of a climate control system, and indicate whether the second harmonic has degraded.

These features and functions may be achieved independently in various embodiments or may be combined in other embodiments. Further details of the embodiments can be seen with reference to the following description and drawings.

BRIEF DESCRIPTION OF THE DRAWINGS

FIG. 2 is an illustration of a method of predicting an impending failure in a climate control system.

FIG. 3 is an illustration of a method of performing a spectral analysis of a temperature history of a climate control system.

DETAILED DESCRIPTION

Figure 1:
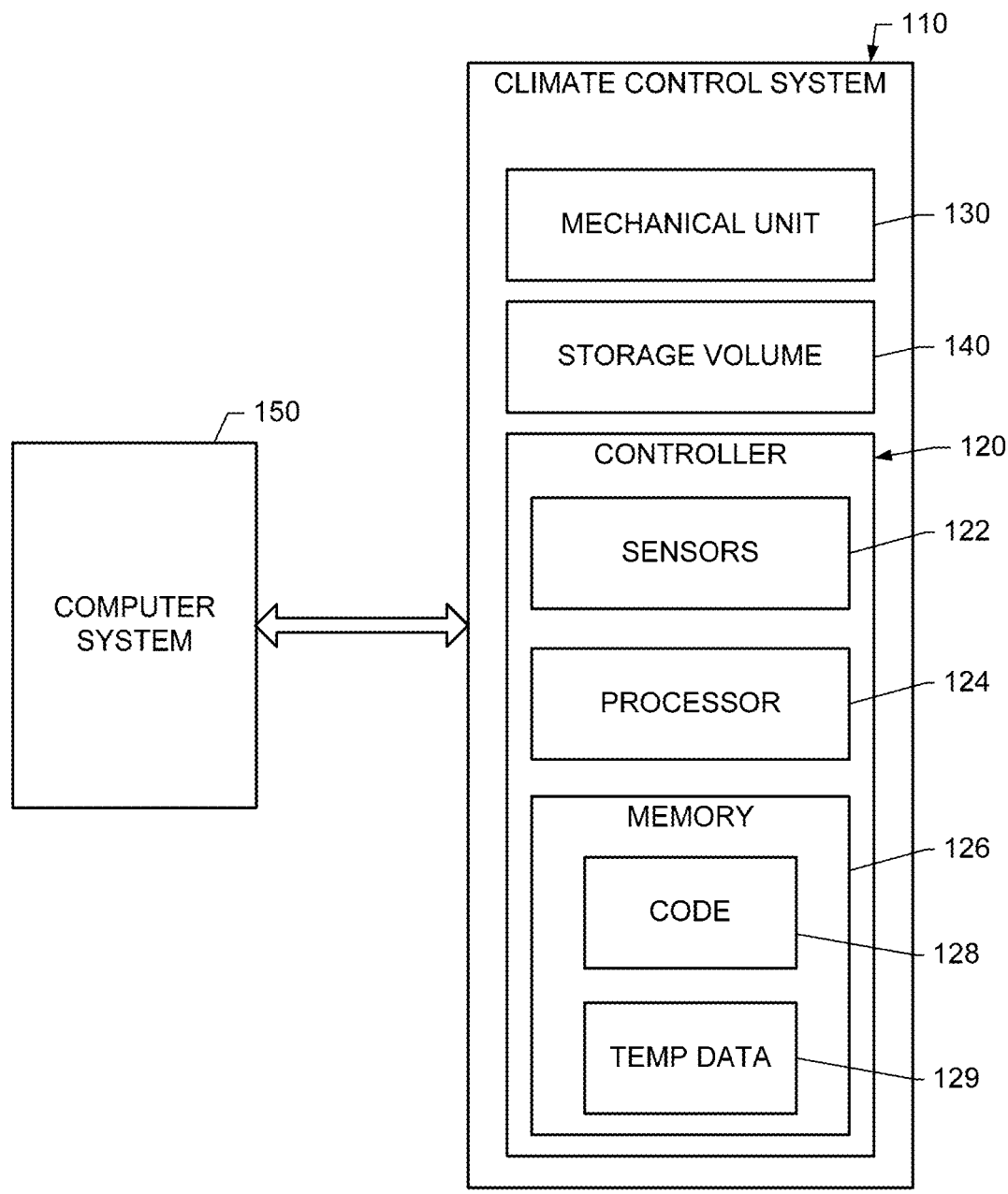
FIG. 1 is an illustration of a climate control system.

Reference is made to FIG. 1, which illustrates a climate control system 110 including a controller 120 and a mechanical climate control unit 130 that responds cyclically to the controller 120. The mechanical unit 130 may include a mechanical heat transfer unit for transferring heat into or out of a controlled environment. As a first example, the mechanical unit 130 includes a furnace for adding heat to a room or other enclosure. As a second example, the mechanical unit 130 includes an air conditioning unit or a refrigeration unit for removing heat from a room or other enclosure.

The climate control system 110 is not limited to temperature control. For instance, the climate control system 110 may control humidity instead of or in addition to temperature.

In some embodiments, the climate control system 110 also includes a thermally insulated storage volume 140. For example, if the climate control system 110 includes a freezer, the mechanical unit 130 may include a heat pump, and the storage volume 140 may be a thermally-insulated compartment or a walk-in cold room.

The controller 120 includes temperature sensors 122 for collecting temperature data about the climate being controlled. In some embodiments, such as the embodiment shown in FIG. 1, the controller 120 includes a processor 124 and memory 126. The memory 126 stores code 128 that, when executed, causes the processor 124 to perform climate control functions such as maintaining the controlled environment at a set temperature or within a temperature range.

In some embodiments, the code 128 may also cause the processor 124 to process the raw sensor signals into temperature data and store the temperature data 129 in the memory 126. In other embodiments, the controller 120 may output raw sensor signals to a computer 150 or other machine. The raw sensor signals may be processed by the computer 150. The signals may be sent to the computer 150 via wire or wirelessly.

Additional reference is made to FIG. 2, which illustrates a method of predicting an impending failure in the climate control system 110. At block 210, a temperature history of the climate control system 110 is collected. For instance, the temperature sensors 122 provide measurements of temperatures inside the storage volume 140, and the measurements are arranged into temperature history of temporal temperature data. That is, the measurements are arranged in order of the times at which they were measured.

At block 220, the computer system 150 determines whether a second harmonic in the temperature history has degraded. The applicants have discovered that degradation of the second harmonic is a predictor of impending failure of the climate control system 110. A climate control system 110 having a mechanical heat transfer unit 130 generally exhibits a signature expressed in the second harmonic long before failure occurs.

The degradation of the second harmonic is not a sign of temperature problems, but rather an indicator of problems in general. For instance, a freezer may fail if the compressor fails to function or its controller fails to regulate the on/off cycle based on its normal routine.

The temperature history is continually updated (block 210). The degradation of the second harmonic is continually monitored (block 220).

In some embodiments, the temperature may be sensed at a single point inside the storage volume 140. In other embodiments, multiple sensors may sense temperatures at multiple points within the volume 140 to detect temperature deviation within the storage volume 140. For instance, such multipoint sensing may be used in a large walk-in freezer. Impending failure would be predicted for each sensor.

In some embodiments, the computer system 150 may be a personal computer. In other embodiments, the computer system 150 may be a server or part of a server system. In still other embodiments, the computer system 150 may include an embedded processor that is integrated with the controller 120 or part of another system.

Reference is now made to FIG. 3. The second harmonic may be computed from a spectral analysis of the temperature history. The spectral analysis may be computed as follows. Temperature measurements are collected continuously (block 310). Each measurement is binned according to magnitude (block 320). A Fast Fourier Transform (FFT) is then applied to a time series of the binned measurements to produce the spectral analysis (block 330). The spectral analysis includes a primary frequency and a second harmonic.

Figure 4:
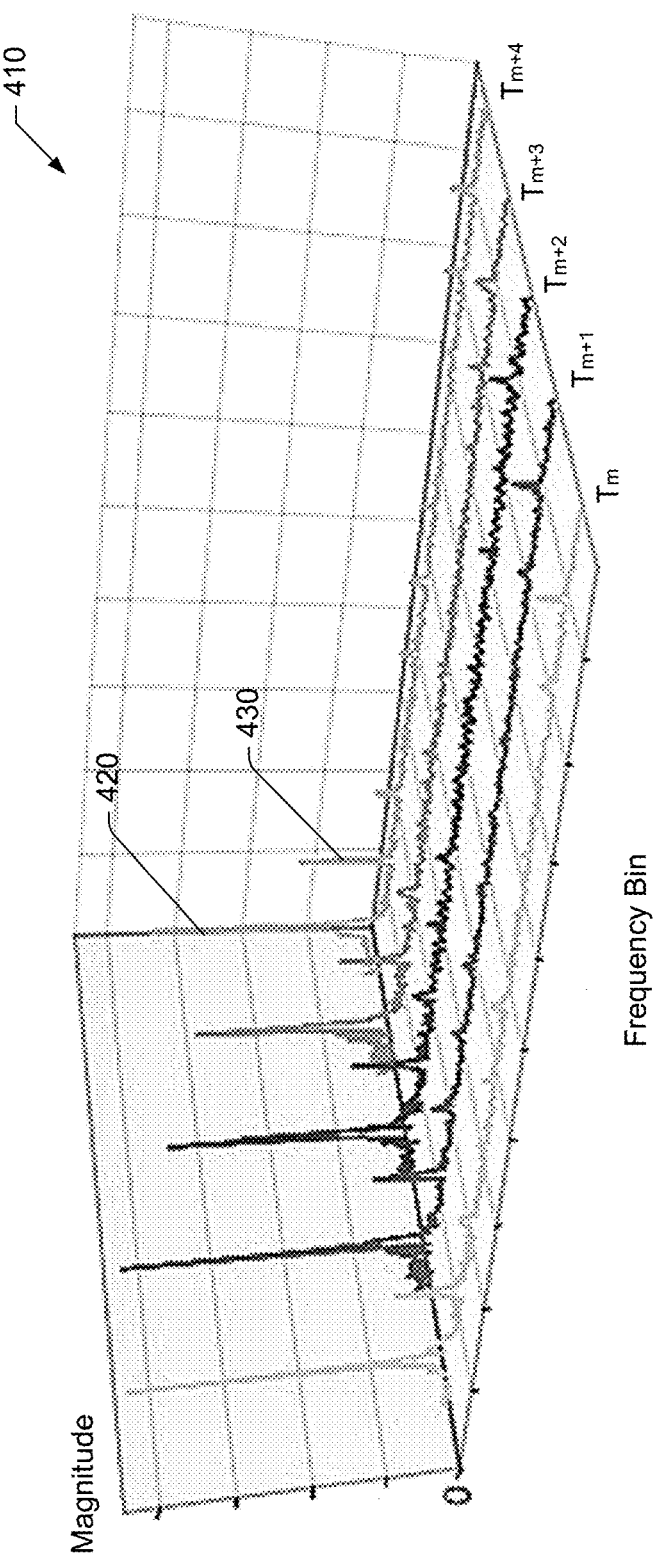
FIG. 4 is an illustration of a spectral analysis of temperature measurements for a climate control system.

Reference is made to FIG. 4, which illustrates a spectral analysis 410 of actual temperatures taken for an industrial grade freezer. The spectral analysis was computed from temperature measurements that were taken once per second. The spectral analysis may be characterized as a 3-D histogram consisting of a collection of 2-D histograms at different time periods. FIG. 4 shows a first 2-D histogram at period $T_m$, a second 2-D histogram at period $T_{m+1}$, a third 2-D histogram at period $T_{m+2}$, a fourth 2-D histogram at period $T_{m+3}$, and a fifth 2-D histogram at period $T_{m+4}$.

The fifth 2-D histogram was computed by applying a 1024 points FFT having to 1024 time series measurements at time periods $T_m$ to $T_{m+4}$. The FFT produces a 2-D histogram having 512 bins.

For each 2-D histogram, the bin having the highest frequency is characterized as the primary frequency 420, and the bin having the second highest frequency is characterized as the second harmonic 430. The 3-D histogram 410 illustrates changes in the second harmonic 430 over time.

Figure 5:
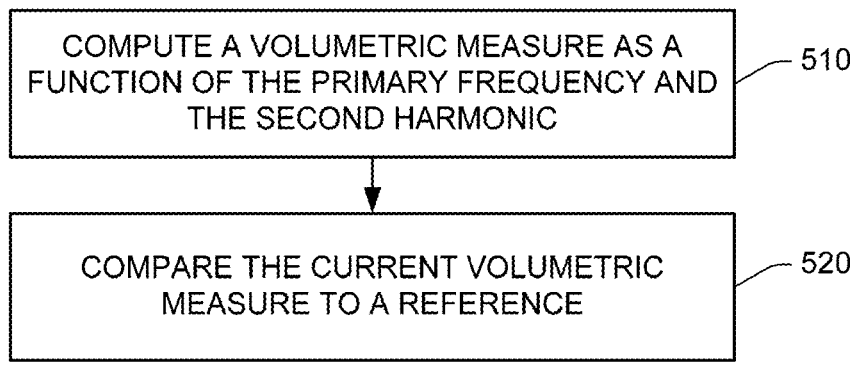
FIG. 5 is an illustration of a method of determining whether a second harmonic of a temperature history has degraded.

Reference is now made to FIG. 5, which illustrates a method of determining whether the second harmonic has degraded. At block 510, a volumetric measure is computed as a function of the primary frequency and the second harmonic. The volumetric measure may be computed, for example, as the volume of a cylinder, where the radius represents the magnitude of the second harmonic, and the height represents the magnitude of the primary frequency. That is, the volumetric measure V is computed as $V=\pi r^2 h$.

At block 520, the current volumetric measure ($V_1$) is then compared to a reference. In some embodiments, the reference may be a second volumetric measure ($V_2$). The second measure ($V_2$) may be a previous measure (e.g., the $10^{th}$ previous measure) or it may be a baseline measure that represents a healthy climate control system. If the current volumetric measure ($V_1$) is less than the reference by a certain percentage, the second harmonic is deemed to have degraded. For example, if the current volumetric measure ($V_1$) is less than 50% of the reference, the second harmonic is deemed to have degraded. However, the percentage actually used may be determined from statistical analysis of test data taken from similar climate control systems.

Determination of the degradation is not limited to the volumetric measure of block 520. As another example, a ratio of the secondary harmonic to the primary frequency is computed, and the ratio is compared to a reference to determine whether the second harmonic has degraded.

A method of determining the degradation is not limited to monitoring only the second harmonic. For example, spectral peaks of the second harmonic and higher harmonics in the spectral analysis may be identified, and pattern recognition on the harmonics may be performed to identify an impending failure.

In some embodiments, the processing of FIG. 5 may be performed by the computer system 150. In other embodiments, the climate control system itself may perform the processing.

Figure 6:
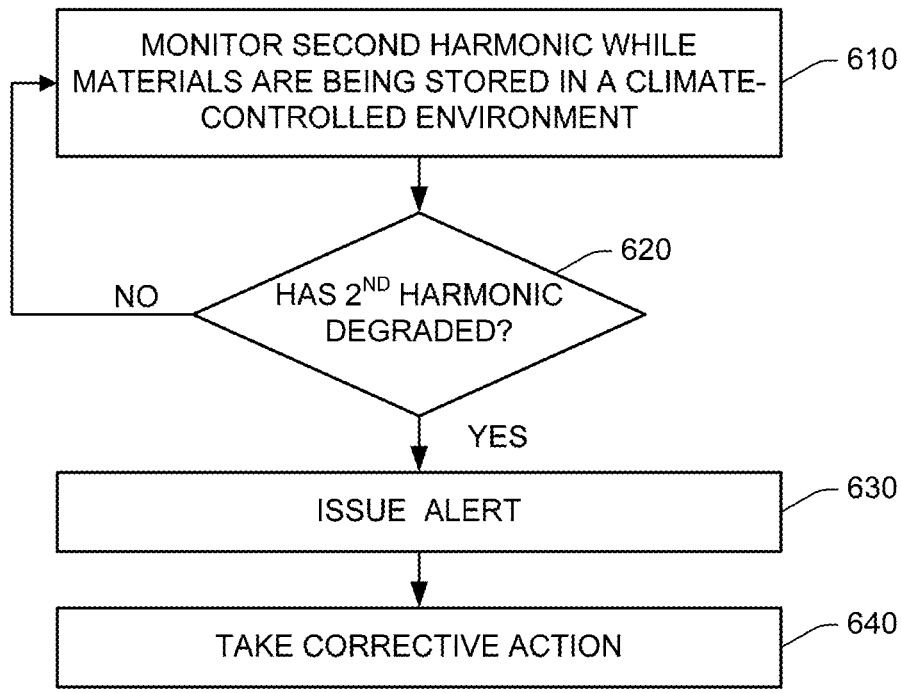
FIG. 6 is an illustration of a method of storing material in a climate-controlled environment.

Reference is now made to FIG. 6, which illustrates a method of storing material in a climate-controlled environment. The second harmonic is monitored while the materials are being stored (block 610). If the second harmonic has degraded (block 620), an alert of an impending failure is issued (block 630). The alert may be issued by email, text message, stack-lights, etc. In some embodiments, the alert may be issued by the climate control system 110. In other embodiments, the alert may be issued by the computer system 150.

Once the alert has been issued, a corrective action may be taken (block 640). The corrective action may include diagnosing a problem with the climate control system (e.g., compressor, expansion, defrost cycle, control system) and fixing the problem, and/or moving the material to another climate control system.

The method of FIG. 6 isn't limited to storing any particular material. As but one example, the method of FIG. 6 may be used to store materials for the manufacture of fiber reinforced composites. Pre-pregs, sealants and other materials are refrigerated prior to use.

By monitoring the second harmonic, the loss of material may be prevented. Downtime due to material delays may also be prevented.

A method and system herein offer several advantages. Degradation of the second harmonic is more indicative of system failure than listening to accelerometer readings on compressor. Moreover, the degradation monitoring provides advance warning, allowing time to respond before valuable materials are lost.

Additional hardware is not needed to monitor the degradation of the second harmonic. Most climate control systems have controllers including temperature sensors and processors. Monitoring algorithms can be embedded within the controllers.

The degradation monitoring may be decoupled from the climate control systems. Advantageously, monitoring can be performed remotely by a computer system.

The remote monitoring gives rise to other advantages. A single computer system can process temperature histories of multiple climate control units. Resulting is a flexible scalable system that can be used to monitor any climate control system enterprise-wide. If the computer system is a server system, climate control systems in geographically remote locations can be connected to the server system via the Internet, and provide data to the server system. The server system monitors the different climate control systems, and issues alerts for those systems whose second harmonic has degraded.

The invention claimed is:

1. A method for predicting an impending failure of a climate control system, comprising:

sensing a plurality of temperature measurements within a storage volume of the climate control system during a first time period;

storing, by a processor of the climate control system, the plurality of temperature measurements as a temperature history in a memory of the climate control system;

calculating, by the processor, a spectral analysis of the temperature history that includes a primary frequency having a primary frequency magnitude and a secondary harmonic having a secondary harmonic magnitude;

calculating, by the processor, a first volumetric measure based on the primary frequency magnitude and the secondary harmonic magnitude;

comparing, by the processor, the first volumetric measure to a reference volumetric measure;

determining, by the processor, that the second harmonic magnitude has degraded to the point of an impending failure of the climate control system in response to the first volumetric measure being less than the reference volumetric measure by a predetermined percentage; and outputting, by the processor, an alert of the impending failure of the climate control system in response to determining that the second harmonic magnitude has degraded to the point of the impending failure.

2. The method of claim 1, wherein the climate control system includes a controller of which the processor is a component and a mechanical heat transfer unit that responds cyclically to the controller.

3. The method of claim 2, wherein the mechanical heat transfer unit includes a refrigeration unit; and wherein the first temperature history includes a refrigeration temperature history.

4. The method of claim 1, wherein calculating the spectral history of the first temperature history includes performing a Fast Fourier Transform (FFT) on the plurality of temperature measurements, whereby the spectral analysis produced by the FFT includes the second harmonic.

5. The method of claim 1, wherein the temperature history is continually updated; and wherein the degradation of the second harmonic is continually monitored.

6. The method of claim 1, wherein calculating the first volumetric measure comprises calculating $V=\pi r^2 h$, wherein V is the first volumetric measure, r is the second harmonic magnitude and h is the primary frequency magnitude.

7. The method of claim 1, further comprising diagnosing components of the climate control system to identify a cause an impending failure.

8. A method of storing material, comprising:
refrigerating the material in a storage volume;
sensing, at a temperature sensor, a plurality of measurements within the storage volume during a first time period;
storing, by a processor operatively connected to the temperature sensor, the plurality of temperature measurements as a temperature history in a memory operatively connected to the processor;
calculating, by the processor, a spectral analysis of the temperature history that includes a primary frequency having a primary frequency magnitude and a secondary harmonic having a secondary harmonic magnitude;
calculating, by the processor, a first volumetric measure based on the primary frequency magnitude and the secondary harmonic magnitude;
comparing, by the processor, the first volumetric measure to a reference volumetric measure;
determining, by the processor, that the second harmonic magnitude has degraded to the point of an impending failure in response to the first volumetric measure being less than the reference volumetric measure by a predetermined percentage; and
taking a corrective action in response to determining that the second harmonic has degraded to the point of the impending failure.

9. The method of claim 8, wherein the material is for the manufacture of fiber reinforced composites.

10. A processor programmed to predict an impending failure in a climate control system, wherein the processor is programmed to:
receive a plurality of temperature measurements during a first time period from a temperature sensor within a storage volume of the climate control system;
store the plurality of temperature measurements as a temperature history in a memory of the climate control system;
calculate a spectral analysis of the temperature history that includes a primary frequency having a primary frequency magnitude and a secondary harmonic having a secondary harmonic magnitude;
calculate a first volumetric measure based on the primary frequency magnitude and the secondary harmonic magnitude;
compare the first volumetric measure to a reference volumetric measure;
determine that the second harmonic magnitude had degraded to the point of an impending failure of the climate control system in response to the first volumetric measure being less than the reference volumetric measure; and
generate an alert of the impending failure of the climate control system in response to determining that the second harmonic has degraded to the point of the impending failure.

11. A system comprising a mechanical heat transfer unit and a controller having the programmed processor of claim 10.

12. The system of claim 11, wherein the mechanical unit includes a refrigeration unit, wherein the system further comprises a thermally insulated storage volume; and wherein the controller collects temperature data representing temperatures inside the storage volume.

13. A server system including the programmed processor of claim 10.

14. An article comprising:
a temperature sensor disposed within a storage volume of a climate control system;
a computer memory; and
the programmed processor of claim 10, wherein the computer memory is encoded with data for causing the programmed processor to predict the impending failure of the climate control system in accordance with the programming of claim 10.

\* \* \* \* \*